United States Patent [19]

Hioki et al.

[11] Patent Number: 4,939,080
[45] Date of Patent: Jul. 3, 1990

[54] SILVER HALIDE PHOTOSENSITIVE MATERIAL

[75] Inventors: Takanori Hioki; Naoto Ohshima; Masaki Okazaki, all of Kanagawa, Japan

[73] Assignee: Fuji Photo Film Co., Ltd., Kanagawa, Japan

[21] Appl. No.: 259,633

[22] Filed: Oct. 19, 1988

[30] Foreign Application Priority Data

Oct. 19, 1987 [JP] Japan .................. 62-263320
Mar. 31, 1988 [JP] Japan .................. 63-78466

[51] Int. Cl.⁵ .................................... G03C 1/20
[52] U.S. Cl. .................... 430/576; 430/567; 430/583; 430/584; 430/600; 430/604
[58] Field of Search ............... 430/567, 576, 583, 584, 430/600, 605, 604

[56] References Cited

U.S. PATENT DOCUMENTS 2,481,022 9/1949 Kendall et al. .
4,618,570 10/1986 Kadowaki et al. ............... 430/505

FOREIGN PATENT DOCUMENTS

A0244184 4/1987 European Pat. Off. .
A3510968 10/1985 Fed. Rep. of Germany .
A2002564 10/1969 France .

OTHER PUBLICATIONS

Journal of Imaging Science, vol. 32, No. 2 Mar./Apr. 1938, pp. 81-84, The Society for Imaging Science and Technology, Springfield, Virginia U.S.A.; W. Lou et al; "Studies of Supersenitization of Some Bridged Carbocyanines by Triazino Stilbenedisulfonic Acids".

*Primary Examiner*—Roland E. Martin
*Assistant Examiner*—Janet C. Baxter
*Attorney, Agent, or Firm*—Sughrue, Mion, Zinn, Macpeak & Seas

[57] ABSTRACT

A silver halide photosensitive material is described which comprises at least one layer of a silver halide emulsion layer provided on a base, wherein said at least one silver halide emulsion layer comprises at least one novel dye compound represented by general formula (I):

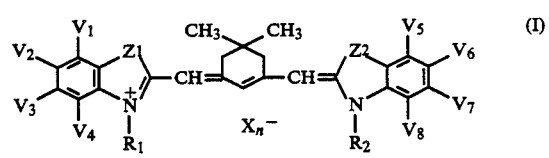

wherein $Z_1$ and $Z_2$ are independently represents a sulfur atom or a selenium atom;

$R_1$ and $R_2$ each independently represents an alkyl group, provided that at least one of $R_1$ or $R_2$ must represent a butyl group, a pentyl group, a hexyl group, a heptyl group or an octyl group;

$V_1$, $V_2$, $V_3$, $V_4$, $V_5$, $V_6$, $V_7$ and $V_8$ each independently represents a hydrogen atom, a halogen atom, an alkyl group, an acyl group, an acyloxy group, an alkoxycarbonyl group, a carbamoyl group, a sulfamoyl group, a carboxy group, a cyano gorup, a hydroxy group, an amino group, an acylamino group, an alkoxy group, an alkylthio group, an alkysulfonyl group, a sulfonate group, or an aryl group, provided that adjacent groups represented by $V_1$ to $V_8$ can bond to each other via their carbom atoms to form a condensed ring;

X represents a charged ion in equilibrium, and n is a value necessary to neutralize the electrical charge of said dye compound.

13 Claims, No Drawings

SILVER HALIDE PHOTOSENSITIVE MATERIAL

FIELD OF THE INVENTION

This invention relates to a silver halide photosensitive material. More particularly, it relates to a silver halide emulsion which, during the manufacturing process of the photographic material produced therefrom, exhibits substantially no difference in photographic properties between lots or batches of the product and which also has excellent long term storage properties as a photosensitive material.

BACKGROUND OF THE INVENTION

In photographic products such as print paper for color prints where the market demands delivery of high volumes of prints in a short period of time, the need to decrease developing time has resulted in the increased use of silver bromide which contains essentially no silver iodide, such as, for example, silver chlorobromide.

In response to recent demands for even more rapid processing of color printing paper, processes have been developed where the silver chloride content of the silver halide emulsion has been increased to produce dramatic improvement in developing time.

The photosensitive materials produced by these processes, however, have exhibited a severe lack of consistency among different lots during the production processes in terms of the photographic properties such as spectral sensitivity due in part to the deterioration of the photosensitive materials. This has posed significant practical problems to the use of these materials. It is clear that severe problems are attendant with the use of these so-called "high silver chloride emulsions".

Improvements in spectral sensitivity, storage properties, and in infrared photographic fog have been reported for methods involving the addition of water-soluble bromides (JP-A No. 52-151026 (the term "JP-A" as used herein refers to an "unexamined published Japanese patent application")), the addition of iridium salts (JP-A No. 54-23520), the addition of hardening agents (U.S. Pat. No. 4,618,570 corresponding to JP-A No. 60-202436 and U.S. Pat. No. 4,670,377 corresponding to JP-A No. 61-123834), the addition of color sensitizing agents (JP-A No. 61-203447) and the addition of spectral sensitizing dyes (U.S. Pat. No. 4,442,201 corresponding to JP-A No. 58-7629).

In addition, JP-A No. 60-225147 proposed the addition of silver chlorobromide having (100) and (111) crystal planes in order to improve spectral sensitivity and storage properties, and to reduce the differences among emulsion lots.

However, none of these methods have proven entirely satisfactory in terms of consistency among manufacturing batches or in terms of storage properties.

SUMMARY OF THE INVENTION

Accordingly, the object of the present invention is to provide a photosensitive material in the form of a silver halide emulsion, particularly a high silver chloride emulsion material, which achieves substantially no variation in spectral sensitivity among production lots of the silver halide emulsion, and which exhibits substantially no variation in spectral sensitivity after storage under high temperature and/or high humidity conditions.

The present invention achieves the abovedescribed object by providing a silver halide photosensitive material comprising at least one silver halide emulsion layer provided on a base, wherein the emulsion layer contains at least one novel dye compound represented by general formula (I):

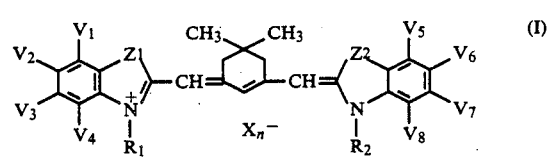

wherein $Z_1$ and $Z_2$ each independently represents a sulfur atom or a selenium atom;

$R_1$ and $R_2$ each independently represents an alkyl group, provided that at least one of $R_1$ and $R_2$ represents a butyl group, a pentyl group, a hexyl group, a heptyl group or an octyl group;

$V_1$, $V_2$, $V_3$, $V_4$, $V_5$, $V_6$, $V_7$ and $V_8$ each independently represents a hydrogen atom, a halogen atom, an alkyl group, an acyl group, an acyloxy group, an alkoxycarbonyl group, a carbamoyl group, a sulfamoyl group, a carboxy group, a cyano group, a hydroxy group, an amino group, an acylamino group, an alkoxy group, an alkylthio group, an alkylsulfonyl group, a sulfonate group, or an aryl group, further provided that adjacent groups represented by $V_1$ to $V_8$ such as $V_1$ and $V_2$, $V_2$ and $V_3$, etc., can bond to each other via their carbon atoms to form a condensed ring;

X represents a charged ion in equilibrium, where n is a value necessary to neutralize the electrical charge of the compound.

In the above listing, or hereinafter referring to, of alkyl groups, alkyl residual groups (moieties), carbamoyl groups, sulfamoyl groups, amino groups, aryl groups and aryl residual groups, any may also be taken to mean the substituted variations.

DETAILED DESCRIPTION OF THE INVENTION

General formula (I) will now be described in further detail.

$Z_1$ and $Z_2$ each independently represents a sulfur atom or a selenium atom, preferably each represents a sulfur atom.

Preferred groups represented by $R_1$ and $R_2$ include non-substituted alkyl groups with 18 or fewer carbon atoms (such as methyl, ethyl, propyl, butyl, pentyl, hexyl, heptyl, octyl, decyl, dodecyl, octadecyl), or substituted alkyl groups with 18 or fewer carbon atoms (with substitution groups such as a carboxy group; a sulfo group; a cyano group; a halogen atom (such as fluorine, chlorine or bromine); a hydroxy group; an alkoxycarbonyl group with 8 or fewer carbon atoms (such as methoxycarbonyl, ethoxycarbonyl, phenoxycarbonyl, benzyloxycarbonyl); an alkoxy group with 8 or fewer carbon atoms (such as methoxy, ethoxy, benzyloxy, phenethyloxy); a single ring aryloxy group with 15 or fewer carbon atoms (such as phenoxy, p-tolyloxy); an acyloxy group with 8 or fewer carbon atoms (such as acetyloxy, propionyloxy); an acyl group with 8 or fewer carbon atoms (such as acetyl, propionyl, benzoyl); a carbamoyl group (such as carbamoyl, N,N-dimethylcarbamoyl, morpholinocarbonyl, piperidinocarbonyl); a sulfamoyl group (such as sulfamoyl, N,N- dimethylsulfamoyl, morpholinosulfonyl, piperidinosulfonyl); an aryl group with 15 or fewer carbon atoms (such as phenyl, 4-chlorophenyl, 4-methylphenyl, α-naphthyl) or other substituted alkyl groups with 18 or fewer carbon atoms).

More preferred are non-substituted alkyl groups (such as methyl, ethyl, propyl, butyl, pentyl, hexyl, heptyl, octyl), and sulfoalkyl groups (such as 2-sulfoethyl, 3-sulfopropyl, 4-sulfobutyl).

As recited in the claims, at least one of $R_1$ and $R_2$ represents a butyl group, a pentyl group, a hexyl group, a heptyl group or an octyl group, and more preferably a pentyl group.

$V_1$, $V_2$, $V_3$, $V_4$, $V_5$, $V_6$, $V_7$ and $V_8$ each independently represents a hydrogen atom; a halogen atom (such as fluorine, chlorine, bromine); a non-substituted alkyl group with 10 or fewer carbon atoms (such as methyl, ethyl); a substituted alkyl group with 18 or fewer carbon atoms (such as benzyl, α-naphthylmethyl, 2-phenylethyl, trifluoromethyl); an acyl group with 8 or fewer carbon atoms (such as acetyl, benzoyl); an acyloxy group with 8 or fewer carbon atoms (such as acetyloxy), or an alkoxycarbonyl group with 8 or fewer carbon atoms (such as methoxycarbonyl, ethoxycarbonyl).

More preferred is that they independently represent a hydrogen atom, a non-substituted alkyl group (such as methyl), or an alkoxy group (such as methoxy).

$X_n$ represents either an anion or cation to neutralize the ionic charge of the compound, where n may assume a value of 0 or greater.

Suitable cations include inorganic and organic ammonium ions or alkali metal ions, while representative anions include inorganic or organic anions such as a halogen ion (such as a fluoride ion, a chloride ion, or an iodide ion); a substituted arylsulfonate ion (such as a p-toluene sulfonate ion, a p-chlorobenzene sulfonate ion); an aryl disulfonate ion (such as a 1,3-benzene disulfonate ion, a 1,5-naphthalene disulfonate ion, a 2,6-naphthalene disulfonate ion); an alkylsulfate ion (such as a methyl sulfate ion); a sulfate ion; a thiocyanate ion; a perchlorate ion; a tetrafluoroborate ion; a picrate ion; an acetate ion; and a trifluoromethane sulfonate ion. However, an iodide ion is preferred.

Specific examples of dyes which are represented by general formula (I) are listed in the following table, but it should be understood that the present invention is not limited thereto.

| Compound No. | $R_1$ | $R_2$ | $V_2$ | $V_3$ | $V_6$ | $V_7$ | X | n |
|---|---|---|---|---|---|---|---|---|
| 1 | $(CH_2)_3CH_3$ | $C_2H_5$ | H | H | H | H | $I^-$ | 1 |
| 2 | $(CH_2)_4CH_3$ | $C_2H_5$ | H | H | H | H | $I^-$ | 1 |
| 3 | $(CH_2)_5CH_3$ | $C_2H_5$ | H | H | H | H | $I^-$ | 1 |
| 4 | $(CH_2)_6CH_3$ | $C_2H_5$ | $CH_3$ | H | $CH_3$ | H | $I^-$ | 1 |
| 5 | $(CH_2)_7CH_3$ | $C_2H_5$ | $CH_3$ | H | $CH_3$ | H | $I^-$ | 1 |
| 6 | $(CH_2)_4CH_3$ | $C_2H_5$ | $CH_3$ | H | $CH_3$ | H | $I^-$ | 1 |
| 7 | $(CH_2)_3CH_3$ | $C_2H_5$ | $CH_3$ | H | $CH_3$ | H | $I^-$ | 1 |
| 8 | $(CH_2)_4CH_3$ | $C_2H_5$ | $CH_3$ | $CH_3$ | H | H | $I^-$ | 1 |
| 9 | $(CH_2)_4CH_3$ | $C_2H_5$ | H | H | $CH_3$ | $CH_3$ | $I^-$ | 1 |
| 10 | $(CH_2)_4CH_3$ | $(CH_2)_4CH_3$ | $CH_3$ | H | $CH_3$ | H | $I^-$ | 1 |
| 11 | $(CH_2)_4CH_3$ | $C_2H_5$ | $OCH_3$ | H | $OCH_3$ | H | $Br^-$ | 1 |
| 12 | $(CH_2)_4CH_3$ | $C_2H_5$ | $OCH_3$ | $OCH_3$ | H | H | $Cl^-$ | 1 |
| 13 | $(CH_2)_4CH_3$ | $(CH_2)_3SO_3^-$ | H | H | H | H | — | — |
| 14 | $(CH_2)_3CH_3$ | $(CH_2)_4SO_3^-$ | H | H | H | H | — | — |
| 15 | $(CH_2)_4CH_3$ | $CH_2CO_2H$ | $CH_3$ | H | $CH_3$ | H | $H_3C\text{-}C_6H_4\text{-}SO_3^-$ | 1 |
| 16 | $(CH_2)_4CH_3$ | $(CH_2)_3SO_3^-$ | $CH_3$ | H | $CH_3$ | H | — | — |
| 17 | $(CH_2)_4CH_3$ | $(CH_2)_4SO_3^-$ | $CH_3$ | H | $CH_3$ | H | — | — |
| 18 | $(CH_2)_5CH_3$ | $(CH_2)_2SO_3^-$ | $CH_3$ | $CH_3$ | H | H | 1,5-naphthalenedisulfonate | ½ |
| 19 | $(CH_2)_3CH_3$ | $(CH_2)_2OCH_3$ | Cl | H | Cl | H | $I^-$ | 1 |
| 20 | $(CH_2)_4CH_3$ | $(CH_2)_2CN$ | H | Cl | H | Cl | $I^-$ | 1 |

| | | | | | | | |
|---|---|---|---|---|---|---|---|
| 21 | (CH$_2$)$_4$CH$_3$ | (CH$_2$)$_2$OC$_6$H$_5$ | H | CO$_2$H | H | CO$_2$H | Br$^-$ | 1 |
| 22 | (CH$_2$)$_3$CH$_3$ | (CH$_2$)$_2$OH | CH$_3$ | CH$_3$ | CH$_3$ | CH$_3$ | I$^-$ | 1 |
| 23 | (CH$_2$)$_4$CH$_3$ | CH$_3$ | O(CH$_2$)$_2$OH | H | H | H | Br$^-$ | 1 |
| 24 | (CH$_2$)$_7$CH$_3$ | (CH$_2$)$_7$CH$_3$ | H | H | H | H | ClO$_4$ | 1 |
| 25 | (CH$_2$)$_4$CH$_3$ | C$_2$H$_5$ | H | CH$_3$ | H | CH$_3$ | I$^-$ | 1 |
(26) 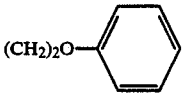
(27) 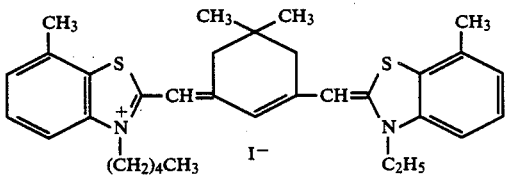
(28) 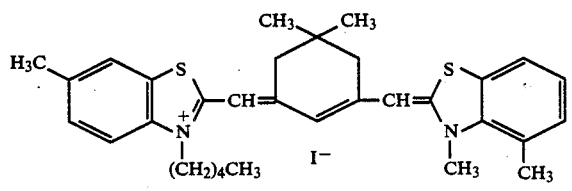
(29) 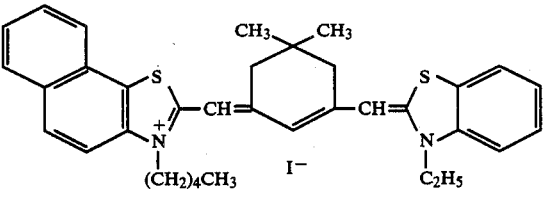
(30) 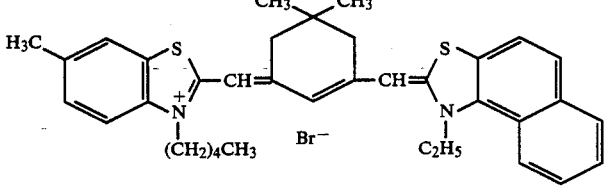
(31) 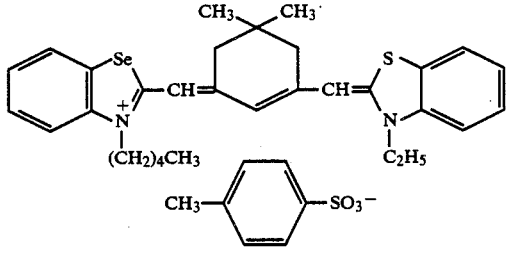
(32) 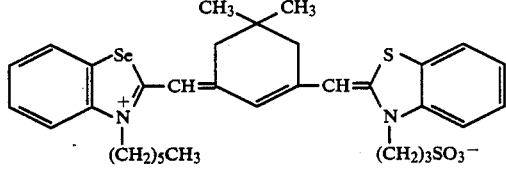

(33)
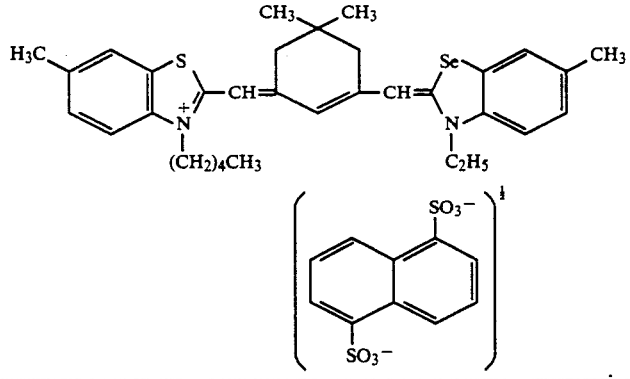

The novel dye compounds represented by general formula (I) can be synthesized according to methods described in publications such as the following: F. M. Hamer, *Heterocyclic Compounds—Cyanine dyes and related compounds,* Chapter IX, pp. 270 to 287, John Wiley & Sons Publishers, New York, London, 1946; and in D. M. Strumer, *Heterocyclic Compounds—Special topics in heterocyclic chemistry,* Chapter 8, Section 4, pp. 482 to 515, John Wiley & Sons Publishers, New York, London, 1977.

Any conventional method may be used to add a compound represented by formula (I) to the silver halide emulsion. It is normally dissolved in a water-soluble solvent or in a solvent mixture of methanol, ethanol, pyridine, methyl cellosolve, acetone, etc., and then added to the silver halide emulsion.

This addition may be made during any phase of the production process for the silver halide emulsion; however, it is preferable to make the addition either prior to or after the addition of stabilizers and antifogging agents, and during or after the completion of the chemical ripening process of the emulsion.

There are no particular restrictions on the amount of the compound (I) of this invention which is added. In general, the amount is in the range of from $1 \times 10^{-6}$ to $1 \times 10^{-3}$ mol per mol of silver halide; preferably from $1 \times 10^{-5}$ to $1 \times 10^{-4}$ mol per mol of silver halide.

It is also possible to use color sensitizing agents. Examples of suitable color sensitizing agents are described in *Photographic Science and Engineering,* Vol. 13, pp. 13 to 17 (1969), and in Vol. 18, pp. 418 to 430 (1974) of the same book, and in *The Theory of the Photographic Process,* James ed., 4th printing, Macmillan Press, 1977, p. 259. One may achieve a high sensitivity when the color sensitizing agents are appropriately selected.

In general, any type of supersensitizing agent may be used, but those conforming to general formula (II) are preferred.

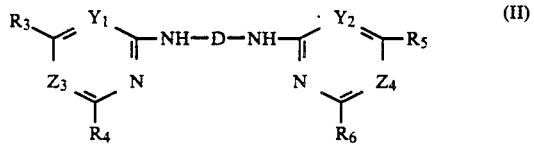

In the formula, D represents a residual aromatic group having a valence of 2. $R_3$, $R_4$, $R_5$ and $R_6$ each independently represents a hydrogen atom, a hydroxy group, an alkoxy group, an aryloxy group, a halogen atom, a heterocyclic group, a mercapto group, an alkylthio group, an arylthio group, a heterocyclic thio group, an amino group, an alkylamino group, a cyclohexylamino group, an aralkylamino group or an aryl group.

$Y_1$ and $Z_3$ each independently represents $-N=$ or $-CH=$, provided that at least one of $Y_1$ and $Z_3$ must represent $-N=$.

$Y_2$ and $Z_4$ are the same as $Y_1$ and $Z_3$, respectively.

General formula (II) will now be described in more detail.

D represents an aromatic residual group having a valence of 2 (which may be a single aromatic group nucleus, at least two aromatic nuclei which have been directly joined or joined via an atom or a group of atoms to form a residual group, for example, groups structures such as a phenyl, naphthalene, stilbene, bibenzyl group). Those structures expressed below as $D_1$ and $D_2$ are preferred.

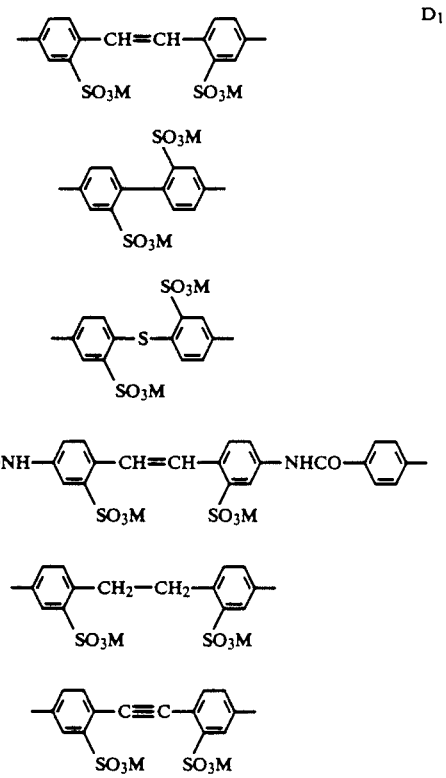

In the above groups, M represents a hydrogen atom or a cation which adds the attribute of water solubility (such as alkali metal ions (Na, K, etc.), an ammonium ion, etc.).

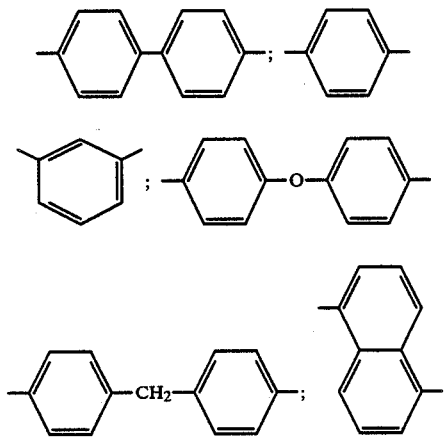

$D_2$

In the case of $D_2$, at least one of $R_3$, $R_5$ or $R_6$ is substituted with a —$SO_3M$ containing group where M is as defined above for $D_1$.

$R_3$, $R_4$, $R_5$ and $R_6$ each independently represents a hydrogen atom; a hydroxy group; an alkoxy group (such as methoxy, ethoxy); an aryloxy group (such as phenoxy, naphthoxy, o-tolyloxy, p-sulfophenoxy); a halogen atom (such as chlorine, bromine); a heterocyclic group (such as morpholinyl, piperidyl); a mercapto group; an alkylthio group (such as methylthio, ethylthio); an arylthio group (such as phenylthio, tolylthio); a heterocyclic thio group (such as benzothiazoylthio, benzimidazoylthio); an amino group; an alkylamino group (such as methylamino, ethylamino, propylamino, dimethylamino, diethylamino, dodecylamino, β-hydroxyethylamino, di-β-hydroxyethylamino, β-sulfoethylamino); a cyclohexylamino group; an arylamino group (such as anilino, o-, m- or p-chloroanilino, o-, m- or panisidino, o-, m- or p-toluidino, o-, m- or p-carboxy anilino, hydroxyanilino, sulfonaphthylamino, o-, m- or p-aminoanilino, o-acetaminoanilino, heterocyclic amino, 2-pyridylamino); or an aryl group (such as phenyl).

It is preferred that at least one of $R_3$ through $R_6$ of general formula (II) represent an aryloxy group, a heterocyclic thio group or a heterocyclic amino group.

The compounds below are representative examples of compounds conforming to general formula (II), but the present invention is not to be construed as being limited to these examples.

(II- 1) 4,4,-Bis[2,6-di(benzothiazolyl-2-thio)pyrimidine-4-ylamino]stilbene-2,2'-disulfonic acid disodium salt (II- 2) 4,4'-Bis[2,6-di(benzothiazolyl-2-amino)pyrimidine-4-ylamino]stilbene-2,2'-disulfonic acid disodium salt (II- 3) 4,4'-Bis[2,6-di(1-phenyltetrazolyl-5-thio)pyrimidine-4-ylamino]stilbene-2,2'-disulfonic acid disodium salt (II- 4) 4,4'-Bis[2,6-di(benzimidazolyl-2-thio)pyrimidine-4-ylamino]stilbene-2,2,-disulfonic acid disodium salt (II- 5) 4,4'-Bis[2-chloro-6-(2-naphthyloxy)pyrimidine-4-ylamino]biphenyl-2,2'-disulfonic acid disodium salt (II- 6) 4,4,-Bis[2,6-di(naphthyl-2-oxy)pyrimidine-4-ylamino]stilbene-2,2'-disulfonic acid disodium salt (II- 7) 4,4'-Bis[2,6-di(naphthyl-2-oxy)pyrimidine-4-ylamino]bibenzyl-2,2,-disulfonic acid disodium salt (II- 8) 4,4'-Bis(2,6-diphenoxypyrimidine-4-ylamino)stilbene-2,2,-disulfonic acid disodium salt (II- 9) 4,4'-Bis(2,6-diphenylthiopyrimidine-4-ylamino)-stilbene-2,2,-disulfonic acid disodium salt (II-10) 4,4'-Bis(2,6-dichloropyrimidine-4-ylamino)stilbene-2,2'-disulfonic acid disodium salt (II-11) 4,4'-Bis(2,6-dianilinopyrimidine-4-ylamino)stilbene-2,2,-disulfonic acid disodium salt (II-12) 4,4'-Bis[4,6-di(naphthyl-2-oxy)triazine-2-ylamino]stilbene-2,2'-disulfonic acid disodium salt (II-13) 4,4'-Bis(4,6-dianilinotriazine-2-ylamino)stilbene-2,2,-disulfonic acid disodium salt (II-14) 4,4'-Bis(2,6-dimercaptopyrimidine-4-ylamino)-biphenyl-2,2,-disulfonic acid disodium salt (II-15) 2,2,-Bis[4,6-di(naphthyl-2-oxy)pyrimidine-2-ylamino]stilbene-2,2'-disulfonic acid disodium salt (II-16) 2,2'-Bis[4,6-di(benzothiazolyl-2-thio)pyrimidine-2-ylamino]stilbene-2,2,-disulfonic acid disodium salt (II-17) 2,2'-Bis[4,6-di(1-phenyltetrazolyl-2-amino)-pyrimidine-2-ylamino]stilbene-2,2,-disulfonic acid disodium salt (II-18) 2,2'-Bis[4,6-di(naphthyl-2-oxy)pyrimidine-2-ylamino]bibenzyl-2,2'-disulfonic acid disodium salt The order in which the above-mentioned compound (I) and compound (II) are added to the emulsion does not matter; either may be added before the other or they may be added at the same time. It is also possible to make the addition via a mixed solution of compounds (I) and (II).

The amount of compound (II) added generally is in the range of from $1 \times 10^{-6}$ to $1 \times 10^{-1}$ mol per each mol of silver halide, preferably in the range of from $5 \times 10^{-5}$ to $1 \times 10^{-1}$ mol per mol of silver halide. The preferred range for the molar ratios of compounds (I) and (II) added is from 1/50 to 10/1.

The desired amounts of silver chlorobromide and silver chloroiodide may be included in the silver halide emulsion of this invention. In addition, the emulsion additionally comprises other silver halides such as silver chloride and silver bromide. In this invention, the silver halide emulsion, particularly in cases where a rapid developing rate and excellent processing properties are demanded in color print paper applications, should include chlorine atoms in the silver halide formulation. One should include at least 1 mol % of silver chloride in the silver chlorobromide or silver chloroiodobromide preferably 10 mol % or more of silver chloride. In the case where silver chloroiodobromide is used as the silver halide in this invention, the content of silver iodide should preferably be kept to 2 mol % or less.

When especially rapid processing properties are desired, the silver halide composition should contain 90 mol % or more of silver chloride based upon the total mols of silver halide and contain essentially no silver iodide. What is meant by containing essentially no silver iodide is that its content be 1.0 mol % or less. A desirable silver halide formulation used in this invention would be 90 mol % or more of silver chloride, and essentially no silver iodide, comprising the silver chlorobromide salt. An even more desirable formulation would be 97 mol % or more of silver chloride, and essentially no silver iodide, comprising the silver chlorobromide salt.

The silver halide particles used in this invention should be those in which the silver bromide content is 20 mol % or more based on total silver halide content in localized rich phase (hereinafter simply referred to a "localized"). The localized phase in the present invention means a phase in which a silver bromide content in the silver halide grains is higher than those of other silver halide grains. With this range of silver bromide content, one can easily obtain differing localized phase configurations. When the localized phase has a high silver bromide content, in the interior of the silver halide particles, it may be positioned either in the surface of sub-surface, or divided between the surface and sub-surface of the particles. Whether in the interior or on the surface, the localized phase may be such that there is a laminar structure which surrounds the silver halide particles, or there may be a non-continuous, independent structure. A good example of this high silver bromide content localized phase configuration is when there has been an epitaxial growth of the localized phase so that the silver bromide content exceeds 20 mol % on the surface of the silver halide particles.

While a high silver bromide content range exceeding 20 mol % for the localized phase is desirable, if the silver bromide content becomes too excessive, then when pressure is applied to the photosensitive materials, their sensitivity is reduced and changes in the composition of the processing liquids can lead to undesirable changes in its sensitivity and the color tones produced in certain cases. Thus, the silver bromide content of the localized phase should be in a range between 20 to 60 mol %, preferably between 30 and 50 mol %. The X-ray diffraction analysis method (such as described in *New Experimental Chemistry Lectures 6 (Shinjikken Kagaku Koza 6)—Structural Analysis* edited by the Japan Chemical Society, and published by Maruzen) or the XPS method (such as described in *Surface Analysis (Hyomen Bunseki)—Applications in IMA, Auger Electron-Photoelectronic Spectrum*, published by Kodansha) may be used to make this determination.

It is preferred that the localized phase comprise between 0.1 and 20 wt % with respect to the total weight of silver in the silver halide particles used in this invention, more preferably between 0.5 and 7 wt % of the silver weight.

The interface between this type of high silver bromide content localized phase and the other phase should have a clear border, and it may also have a short transition boundary where there is a gradual change in the halogen composition.

Several methods can be used to form this localized phase having the high silver bromide content. For example, the localized phase can be formed by reacting either one at a time or together, soluble silver salts and soluble halogen salts. Further, the already formed silver halide can be further processed using a silver halide with a lower solubility, the so-called composition method, to form the localized phase. Alternatively, very minute silver bromide particles or silver chlorobromide particles can be added so that they recrystallize on the surface of the silver chloride crystals to form the localized phase.

The effect of the present invention is further preferably increased by incorporating metal ions other than silver ion, which include metal ions belonging to Group VIII, transition metal ions belonging to Group II of the Periodic Table, Pb ion, or Ta ion, or complex ion thereof to the localized phase of the silver halide grains or to a base material, which means parts of the silver halide grains other than the localized phase. Chiefly, to the localized phase, Ir ion, Rh ion, or Fe ion, is preferred, and to the base material, a metal ion selected from Os, Ir, Rh, Pt, Rn, Pd, Co, Ni, or Fe, or in combination with a complex ion thereof is preferred. The kind and concentration of metal ion may be varied depending on the use of metal ion either to the localized phase or the base material.

A method for incorporating the metal ion to the, localized phase of silver halide grains and/or base material may be carried out in the step of prior to or during forming the silver halide grains, or during a physical ripening by adding thereof to the processing solution. For instance, the silver halide grains may be prepared by adding the metal ion to a gelatin solution, an aqueous halide solution, an aqueous silver salt solution, or any other aqueous solution. Alternatively, the metal ion is previously incorporated with fine silver halide grains, and the fine grains thus prepared, are added to a desired silver halide emulsion and dissolved thereby introducing the metal ion. The latter method is particularly advantageous when the metal ion is introduced to a silver bromide localized phase on a surface of silver halide grains. The method for adding the metal ion may be optionally adopted depending on the position of the silver halide grains where the metal ion is to be placed.

The localized phase may preferably be formed by simultaneously precipitating with at least 50 percent of all iridium content which is added during the preparation of the aforementioned silver halide grains. Cases in which the localized phase is precipitated together with at least 80% of all iridium added are preferred, and cases in which the localized phase is precipitated together with all of irridum added are most desirable. Here, the term "the said localized phase is precipitated together with iridium ion" signifies that iridium compound is supplied at the same time as the silver and/or is being supplied to form the localized phase, immediately before the supply of the silver or halogen, or immediately after the supply of the silver or halogen.

The silver halide particles in this invention may have (100) planes or (111) planes for the outside surfaces, or a combination of the two. It is preferable that they include even higher level planes, with particles formed from (100) plane surface being preferred. The shape of the silver halide particles used in this invention may be spherical or other irregularly shaped crystals. They may also be tabular particles with a length/thickness ratio of 5 or more. An emulsion which contains tabular particles with a length/thickness ratio of 8 or more having a particle projected surface area of 50% or greater may also be used.

The size of the silver halide particles in this invention may be within a rang that is normally used, preferably between 0.1 μm and 1.5 μm. There may be a large variation in the particle diameter distribution or single diameter particles may be used; monodisperse particles are preferred. To the extent of variation in particle size distribution permitted for the single diameter particles, the ratio between statistical standard deviation (s) and the average particle diameter (d) (s/d) should be 0.2 or less, preferably 0.15 or less. It is also possible to use a mixture in the emulsion of two different monodisperse particle sizes.

In the process of forming the silver halide particles and in the physical repening thereof, cadmium salts, zinc salts, lead salts, thallium salts, iridium salts or their complex salts; rhodium salts or its complex salts; iron salts or iron complex salts may also be present.

After the particle forming process and heat curing, the desalting and the chemical process, the silver halide emulsion is normally applied as a coating.

Silver halide emulsions known in the art may be used which are precipitated (for example, ammonia, potassium rhodanide, the thioethers described in U.S. Pat. No. 3,271,157, JP-A No. 51-12360, JP-A No. 53-82408, JP-A No. 53-144319, JP-A No. 54-100717 and JP-A No. 54-155828), physical ripening, and then chemical ripening. After the physical heat curing, the soluble silver salts are eliminated from the emulsion by a noodle water washing, the flocculation precipitation method, or by a limiting filtration method.

It is possible to increase the chemical sensitivity of the silver halide emulsion used in this invention through the use of sulfur or selenium sensitizing agents, reduction sensitizing agents, or precious metal sensitizing agents, which can either be used alone or in combination.

The active gelatin obtained from the reaction with the silver and the sulfur-containing compound containing sulfur (such as thiosulfate salts, thioureas, mercapto compounds, and rhodanines) may be treated with the sulfur sensitization method; reducing agents such as stannous salts, amines, hydrazine derivatives, formamidine sulfinic acid, or silane compounds may be used in the reduction sensitization method. Alternatively, metal compounds (such as metal complexes, or complex salts of Pt, Ir, Pd, Rh, Fe, etc., of group VIII of the Periodic Table of the elements) can be used to perform precious metal sensitization methods. The above methods may be used alone or in combination. When these various sensitization methods are implemented, stabilizers consisting of a nucleic acid or a decomposition product thereof, a compound having a purine nucleus or a pyrimidine nucleus, or a hydroxytetrazygadenine may also be used.

In order that the color photosensitive material of this invention achieve satisfactory tones, the silver halide emulsion must consist of essentially the same color sensitivity emulsion layer having 2 or more different particle sizes (with the above-described variation rate for particle size) which are mixed within the same emulsion layer, or which are coated atop each other in differing emulsion layers. It is also possible to combine two single sized dispersions of the halogen emulsion and use it in layers in combination with a single sized particle dispersion.

It is possible to use a cyan coupler as the image forming compound in this invention. Preferred among them are the oil protected type of naphthol type and phenol type couplers. More specifically, the couplers mentioned in U.S. Pat. No. 2,474,293, naphthol couplers, and preferably, the couplers described in U.S. Pat. Nos. 4,052,212, 4,146,396, 4,228,233 and 4,296,200 which are oxygen atom release types of 2-equivalent naphthol couplers. Specific examples of phenol type couplers include those described in U.S. Pat. Nos. 2,369,929, 2,801,171, 2,772,162 and 2,895,826. Cyan couplers which are highly resistant to humidity and temperature should be used in this invention. Specific examples include those described in U.S. Pat. No. 3,772,002, which is a phenol nucleus with an alkyl group with 2 or more carbon atoms in the meta-position to comprise a phenol type cyan coupler. Also, there are those described in U.S. Pat. Nos. 2,772,162, 3,758,308, 4,126,396, 4,334,011, 4,327,173, West German Preissued Patent 3,329,729 and in JP-A No. 59-166956 which are 2,5-diacylamino-substituted phenol type coupling agents. In addition, those phenol type coupling agents with a phenylureido group in position 2, and an acylamino group in position 5 such as described in U.S. Pat. Nos. 3,446,622, 4,333,999, 4,451,559 and 4,427,767 can be used.

It is also necessary to use a ballast group or a polymerization of the color coupler which contains the photosensitive materials in order to prevent their further dispersion within. The use of a 2-equivalent color coupler reduces the amount of silver needed in the coating more than when a 4-equivalent coupler is used with a hydrogen atom in the active position. One may use couplers having appropriate dispersion properties for the color dyes, colorless couplers, DIR couplers which release a developing inhibiting agent in conjunction with the coupling reaction, or couplers which release developing promotion agents.

In addition to the above-described cyan couplers, one may also use magenta couplers and yellow couplers.

Representative examples of these include pyrazolone type or pyrazoloazole type compounds, and open chain or complex ring ketomethylene compounds. Specific examples of magenta or yellow coupling agents which may be used in this invention are those listed in the patents cited in *Research Disclosure* (RD) 17643 (December, 1978), page VII-D, in 18717 (November, 1979) of the same.

In order to satisfy any requirements for the photosensitive materials in this invention, two or more of a variety of coupling agents may be used in the same photosensitive layer in this invention, or the same compound can be used in two or more layers.

The couplers used in this invention may be introduced into the photosensitive materials using any number of dispersion methods known in the art. Examples include the solid dispersion method, the alkali dispersion method, or preferably, the polymer dispersion method or the oil droplet dispersion method in water. The oil droplet dispersion method in water involves dissolving the substance in either a high boiling point organic solvent with a boiling point of 175° C. or more, in a low boiling point so-called auxiliary solvent, or in a combination of these solvents, and then dispersing it in water or a water-gelatin solution in the presence of a surfactant. Examples of such high boiling point solvents are listed in U.S. Pat. No. 2,322,027.

Examples of the above-mentioned polymer dispersion method appear in JP-B No. 48-30474 (the term "JP-B" as used herein refers to an "examined Japanese patent publication"), U.S. Pat. No. 3,619,195, Japanese Patent Application No. 61-162813 where polymers which are insoluble in water but soluble in organic solvents are described, and in U.S. Pat. No. 4,203,716 where loadable polymer latex are used.

The general range of amount of color coupler to be used are from 0.001 to 1 mol with respect to 1 mol of the photosensitive silver halide, preferably from 0.01 to 0.5 mol for yellow coupler, from 0.003 to 0.3 mol for magenta coupler and from 0.002 to 0.3 mol for cyan coupler.

The photographic emulsion used in this invention is one which prevents fogging during the production process of the photosensitive materials, during their storage and during photo processing, and it is one which contributes to the stability of photographic properties.

The photosensitive material prepared for use in this invention may also contain color fogging inhibitors or color mixing inhibitors such as hydroquinone derivatives, aminophenol derivatives, amines, gallic acid derivatives, catechol derivatives, ascorbic acid derivatives, colorless couplers, sulfonamide phenol derivatives, etc.

The photosensitive materials of this invention may also contain various types of fading inhibitors.

One may also add ultraviolet light absorbents to a hydrophilic colloidal layer in the photosensitive materials of this invention.

Organic or inorganic membrane hardeners can also be used, as described below, on the backing layer composed of the hydrophilic colloidal layer, or on the photosensitive layer for the photosensitive materials of the invention.

The photosensitive materials of this invention may also include one or more varieties of surfactant which help to improve coating properties, and which act as static electricity inhibitors, lubricants, emulsifiers and dispersing agents, anti-stick agents and as agents to improve photographic characteristics (such as in promoting developing, membrane hardeners, sensitizers). For emulsification, one may use, for example, Compound A below, by itself, or in conjunction with Compound B. Compound B may also be used alone to improve coating properties.

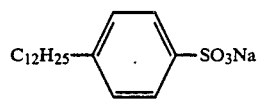

Compound A

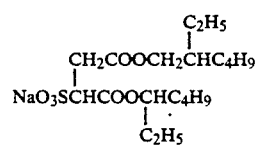

Compound B

In addition, Compounds C and D may be used to form protective layers of blue-sensitive layers.

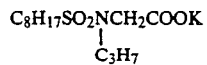

Compound C

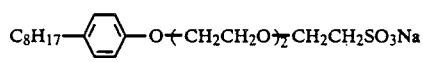

Compound D

Various other stabilizers, contamination inhibitors, developers or their precursors, developing promoters or their precursors, lubricants, mordants, matting agents, static inhibitors, plasticizers or other additives normally used in other photographic photo-sensitive materials may be added to the photosensitive material of this invention in addition to the above-listed additives. Representative additives are listed in *Research Disclosure,* 17643 (December, 1978), and in 18716 (January, 1979).

It is also possible to apply this invention to multilayered multicolored photographic materials composed of layers having two or more different degrees of photosensitivity. Normally, these multilayered natural color photographic materials consist of at least one layer each of a blue-sensitive emulsion layer, a green-sensitive emulsion layer, and a red-sensitive emulsion layer, each atop a base. The order in which these layers are established may be selected according to the specific application. It is also possible to use two or more emulsion layers having differing sensitivities, as described above, or to interpose a non-photosensitive layer between two or more emulsion layers having the same color sensitivity.

Thus, in addition to having a silver halide emulsion layer, the photosensitive materials of this invention may also be used in applications as desired where there are auxiliary layers established such as additional protective layers, intermediate layers, anti-halation layers, and backing layers.

The photographic photosensitive materials of this invention may be applied to flexible bases such as plastic film, baryta paper, polyethylene, etc., laminated paper, or cloth, or may also be applied to a rigid support such as glass, ceramics or metals, etc. Also, as described in both Japanese Patent Application Nos. 61-16880 and 61-168801, a thin metal membrane or a metal powder filled membrane can be provided on a substrate to form a mirror reflector surface, or a second type of diffusion and reflective surface can be established upon the base where the photosensitive materials are applied.

Among the bases which may be used in this invention, preferred are those paper bases made of baryta paper or polyethylene laminates where white pigments (such as titanium oxide) are dispersed within the polyethylene on the paper base.

This invention may be applied to a variety of photosensitive materials. Representative examples are color printing paper and color positive films. This invention may also be applied to black and white photosensitive materials using a three color coupler mixture as described in *Research Disclosure,* 17123 (July, 1978).

The developing of the photosensitive materials of this invention can take place in a color developer which preferably comprises a primary amine developer in an aqueous alkali solution. p-Phenylenediamine type compounds are preferred as the principal ingredient of these developers. Specific examples of these include 3-methyl-4-amino-N,N-diethylaniline, 3-methyl-4-amino-N-ethyl-N-$\beta$-hydroxyethylaniline, 3-methyl-4-amino-N-ethyl-N-$\beta$-methanesulfonamidoethylaniline, 3-methyl-4-amino-N-ethyl-N-$\beta$-methoxyethylaniline and their sulfate salts, chlorate salts or p-toluenesulfonate salts.

Bleaching agents which may be used include organic complex salts of iron(III) or cobalt(III) such as ethylenediaminetetraacetate, diethylenetriaminepentaacetate, nitrilotriacetate, 1,3-diamino-2-propanoltetraacetate and other aminopolycarboxylates or citrates, tartarates or maleates, etc., types of organic acid complex salts. Among the above, iron(III) ethylenediaminetetraacetate complex salt and iron(III) ethylenetriaminepentaacetate complex salts are especially useful in bleaching and fixing solutions.

Thiosulfate salts, thiocyanate salts, thioethers and thiourea compounds, as well as large quantities of iodides may be used as the fixers, but normally, sulfuric acid salts such as thiosulfate salts are normally used.

Water washing is normally included in the process following the bleaching-fixing process.

Water washing is normally implemented in two or more tanks or amidst a flow of water. Furthermore, it is also possible to use the multistage flow of stabilizing processing such as described in JP-A No. 57-8543.

To simplify and decrease the time of processing, the color developer agent may also be included within the photosensitive materials. This may be accomplished by using various precursors of the color developer.

If desired, it is also possible to include various types of 1-phenyl-3-pyrazolidones within the photosensitive materials in order to speed the color developing.

This invention will be described in further detail below through the use of examples. Unless otherwise indicated, all parts, percents, ratios, etc., are by weight.

EXAMPLE 1

32 g of lime-treated gelatin were added to 1,000 cc of distilled water and dissolved at 40° C. Then, 3.3 g of sodium chloride were added and the temperature was increased to 60° C. 3.2 cc of (a 1% aqueous solution) of N,N'-dimethylimidazolidine-2-thione were then added, followed by 32.0 g of silver nitrate dissolved in 200 cc of distilled water, and 15.7 g of potassium bromide and 3.3 g of sodium chloride dissolved in 200 cc of distilled water which were added over a 15 minute period while maintaining the above-described solution at 60° C. Then, while maintaining the solution at 60° C., further addition was made over a 20 minute interval of 128.0 g of silver nitrate dissolved in 560 cc of distilled water, and 62.8 g of potassium bromide and 13.2 g of sodium chloride dissolved in 560 cc of distilled water. Following the completion of the addition of the silver nitrate solution and the alkali halide solution, the temperature was lowered to 40° C. and desalting and water washing were accomplished. Then, further addition was made of 90.0 g of lime-treated gelatin and then sodium chloride was used to adjust the pAg to 7.2. Then, 60.0 mg of the red-sensitive dyes listed in Table 1, and 2.0 mg of triethyl thiourea were added, and chemical sensitizing was performed at the optimum temperature of 58° C. The resulting silver chlorobromide emulsion (with a silver bromide content of 70 mol %) was used as Emulsions Samples A-1 through A-14.

Emulsion Samples A-1 through A-14 were different from each other in that different red-sensitive sensitizing dyes as shown in Table 1 were added prior to the chemical sensitizing operation.

Next, 32 g of lime-treated gelatin were added to 1,000 cc of distilled water and after dissolving at 40° C., 3.3 g of sodium chloride were added and the temperature was increased to 60° C. 3.2 cc of (a 1% aqueous solution) of N,N,-dimethylimidazolidine-2-thione were added. Continuing, 32.0 g of silver nitrate dissolved in 200 cc of distilled water and 11.0 g of sodium chloride dissolved in 200 cc of distilled water were added and mixed in over an 8 minute interval while maintaining a temperature of 60° C. Then, 125.6 g of silver nitrate dissolved in 560 cc of distilled water and 41.0 g of sodium chloride dissolved in 560 cc of water were added and mixed in the above solution over a 20 minute interval while maintaining the temperature at 60° C. 1 Minute after the completion of the addition of the silver nitrate solution and the alkali solutions, 60.0 mg of the red-sensitive sensitizing dyes listed in Table 2 were added. After maintaining the 60° C. temperature for 10 minutes, the temperature was decreased to 40° C. and 2.4 g of silver nitrate dissolved in 20 cc of water and 1.35 g of potassium bromide and 0.17 g of sodium chloride dissolved in 20 cc of distilled water were added and mixed with the above solution over a 5 minute period while maintaining 40° C. After desalting and water washing, 90.0 g of lime-treated gelatin were added and then sodium chloride was used to adjust the pAg to 7.2, after which, 2.0 mg of triethyl thiourea were added to perform the chemical sensitization at the optimum temperature of 58° C. The above operations resulted in obtaining Emulsion Samples B-1 through B-14 of the silver chlorobromide emulsion obtained in this manner (which had a silver bromide content of 1.2 mol %).

The only difference among Emulsion Samples B-1 through B-14 was that different red-sensitive sensitizing dyes were used as shown in Table 2.

This resulted in the preparation of 28 silver halide emulsions, A-1 through B-14. An electron microscope was used to determine the shape, particle size, and the particle size distribution of the particles in these emulsions. All of the particles of silver halide in Emulsion Samples A-1 through B-14 were cubic in shape. The particle size was determined by the average diameter value of a circle which was equivalent to the projected surface area of the particles. The particle size distribution was determined by dividing the standard deviation in particle diameter by the average particle size. Furthermore, the silver halide crystals were subjected to X-ray diffraction analysis in order to determine the halogen composition in the emulsion particles. Those results are shown in Tables 1 and 2.

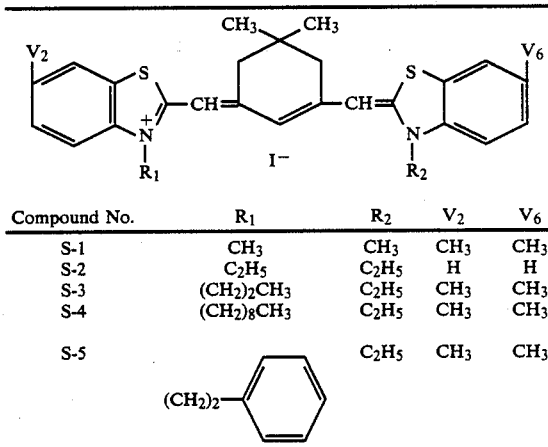

| Compound No. | $R_1$ | $R_2$ | $V_2$ | $V_6$ |
| --- | --- | --- | --- | --- |
| S-1 | $CH_3$ | $CH_3$ | $CH_3$ | $CH_3$ |
| S-2 | $C_2H_5$ | $C_2H_5$ | H | H |
| S-3 | $(CH_2)_2CH_3$ | $C_2H_5$ | $CH_3$ | $CH_3$ |
| S-4 | $(CH_2)_8CH_3$ | $C_2H_5$ | $CH_3$ | $CH_3$ |
| S-5 | $(CH_2)_2\text{—}C_6H_5$ | $C_2H_5$ | $CH_3$ | $CH_3$ |

TABLE 1

| Emulsion | Sensitizing Dye Compound No. | Shape | Size (μm) | Size Distribution | Ag—Cl—BR Composition by X-Ray Diffraction |
| --- | --- | --- | --- | --- | --- |
| A-1 | S-1 (Comparison) | Cubic | 0.51 | 0.10 | AgCl: 30% uniformly |
| A-2 | S-2 (Comparison) | " | " | " | " |
| A-3 | S-3 (Comparison) | " | " | " | " |
| A-4 | S-4 (Comparison) | " | " | " | " |
| A-5 | S-5 (Comparison) | " | " | " | " |
| A-6 | 3 | " | " | " | " |
| A-7 | 4 | " | " | " | " |
| A-8 | 5 | " | " | " | " |
| A-9 | 6 | " | " | " | " |
| A-10 | 7 | " | " | " | " |
| A-11 | 10 | " | " | " | " |
| A-12 | 11 | " | " | " | " |

TABLE 1-continued

| Emulsion | Sensitizing Dye Compound No. | Shape | Size (μm) | Size Distribution | Ag—Cl—BR Composition by X-Ray Diffraction |
|---|---|---|---|---|---|
| A-13 | 13 | " | " | " | " |
| A-14 | 15 | " | " | " | " |

TABLE 2

| Emulsion | Sensitizing Dye Compound No. | Shape | Size (μm) | Size Distribution | Ag—Cl—Br Composition by X-Ray Diffraction |
|---|---|---|---|---|---|
| B-1 | S-1 (Comparison) | Cubic | 0.52 | 0.08 | Composed of AgCl 100% phase and AgBr 10 to 39% localized phase |
| B-2 | S-2 (Comparison) | " | " | " | Composed of AgCl 100% phase and AgBr 10 to 39% localized phase |
| B-3 | S-3 (Comparison) | " | " | " | Composed of AgCl 100% phase and AgBr 10 to 39% localized phase |
| B-4 | S-4 (Comparison) | " | " | " | Composed of AgCl 100% phase and AgBr 10 to 39% localized phase |
| B-5 | S-5 (Comparison) | " | " | " | Composed of AgCl 100% phase and AgBr 10 to 39% localized phase |
| B-6 | 3 | " | " | " | Composed of AgCl 100% phase and AgBr 10 to 39% localized phase |
| B-7 | 4 | " | " | " | Composed of AgCl 100% phase and AgBr 10 to 39% localized phase |
| B-8 | 5 | " | " | " | Composed of AgCl 100% phase and AgBr 10 to 39% localized phase |
| B-9 | 6 | " | " | " | Composed of AgCl 100% phase and AgBr 10 to 39% localized phase |
| B-10 | 7 | " | " | " | Composed of AgCl 100% phase and AgBr 10 to 39% localized phase |
| B-11 | 10 | " | " | " | Composed of AgCl 100% phase and AgBr 10 to 39% localized phase |
| B-12 | 11 | " | " | " | Composed of AgCl 100% phase and AgBr 10 to 39% localized phase |
| B-13 | 13 | " | " | " | Composed of AgCl 100% phase and AgBr 10 to 39% localized phase |
| B-14 | 15 | " | " | " | Composed of AgCl 100% phase and AgBr 10 to 39% localized phase |

Multilayered color print paper was prepared having a polyethylene laminate on both surfaces as the base for the emulsion (using Photosensitive Materials A-1M through B-14M). The coating solutions were prepared as follows.

Preparation of the First Layer Coating Solution:

19.1 g of yellow coupler (ExY) and 4.4 g of color image stabilizer (Cpd-1) were dissolved in 27.2 g of ethyl acetate and 7.7 cc of solvent (Solv-1). This solution was dispersed in 185 cc of a 10% aqueous gelatin solution which contained 8 cc dodecylbenzene sodium sulfonate. Separately, a $5.0 \times 10^{-4}$ mol per mol of silver of the below-mentioned blue-sensitive sensitizing dye was added to the silver chlorobromide. Here, what is meant by silver chlorobromide is a silver bromide content of 70 mol % when using A-1 through A-14 silver halide emulsions in the fifth layer (red-sensitive layer), indicating an Ag content of 70 g/kg, and when B-1 through B-14 emulsions were used, 0.8 mol % of silver bromide, which means an Ag content of 70 g/kg. In addition, 20 times the molar amount of red-sensitive sensitizing dye of Compound (II-6) was added to the red-sensitive layer of the silver halide emulsion.

The above-mentioned emulsified dispersion were combined with the emulsion, and then the first layer coatings were prepared according to the compositions described below. In each layer, 1-oxy-3,5-dichloro-s-triazine sodium salts were used as the gelatin hardener for each of the layers.

The spectral sensitizing dyes listed below were used in the various layers.

Blue-Sensitive Emulsion Layer:

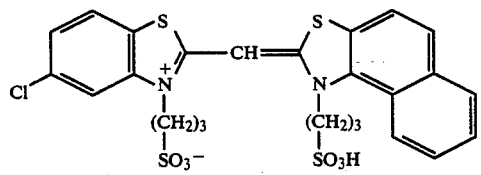

(5.0 × 10⁻⁴ mol per each mol of silver halide)

Green-Sensitive Emulsion Layer:

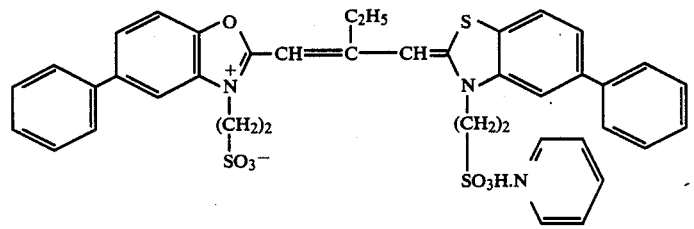

(4.0 × 10⁻⁴ mol per mol of silver halide)

In additional, $8.5 \times 10^{-5}$ mol, $7.7 \times 10^{-4}$ mol, $2.5 \times 10^{-4}$ mol of 1-(5-methylphenyl)-5-mercapto-tetrazole were added, respectively, to the blue-sensitive emulsion layer, the green-sensitive emulsion layer and the red-sensitive emulsion layer per each mol of silver halide in those layers. The following dyes were added below the emulsion layer to prevent irradiation.

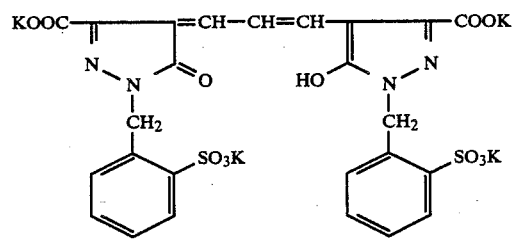

and

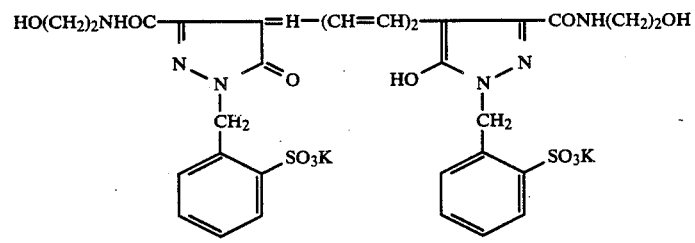

Layer Constitution:

The constitution of the layers will be described below. The numbers represent the amount of coating (g/m²). The amount of silver halide emulsion used is converted to terms of silver content.

Support:

Polyethylene laminated paper (a white pigment (TiO₂) was added to the polyethylene corresponding to the first layer side along with a bluish dye (ultramarine blue))

| Layer 1: Blue-Sensitive Layer | |
|---|---|
| Silver halide emulsion | 0.30 |
| Gelatin | 1.86 |
| Yellow coupler (ExY) | 0.82 |
| Color image stabilizer (Cpd-1) | 0.19 |
| Solvent (Solv-1) | 0.35 |
| Layer 2: Color Mixing Inhibitor | |
| Gelatin | 0.99 |
| Color mix inhibitor (Cpd-2) | 0.08 |
| Layer 3: Green-Sensitive Layer | |
| Silver halide emulsion | 0.36 |
| Gelatin | 1.24 |
| Magenta coupler (ExM) | 0.31 |
| Color image stabilizer (Cpd-3) | 0.25 |
| Color image stabilizer (Cpd-4) | 0.12 |
| Solvent (Solv-12) | 0.42 |
| Layer 4: Ultraviolet Light Absorbing Layer | |
| Gelatin | 1.58 |
| Ultraviolet light absorbent (UV-1) | 0.62 |
| Color blending inhibitor (Cpd-5) | 0.05 |
| Solvent (Solv-3) | 0.24 |
| Layer 5: Red-Sensitive Layer | |
| Silver halide emulsion (A-1 through B-14) | 0.23 |
| Gelatin | 1.34 |
| Cyan coupler (ExC) | 0.34 |
| Color image stabilizer (Cpd-6) | 0.17 |
| Polymer (Cpd-7) | 0.40 |
| Solvent (Solv-4) | 0.23 |
| Layer 6: Ultraviolet Light Absorbing Layer | |

| -continued | |
|---|---|
| Gelatin | 0.53 |
| Ultraviolet light absorbent (UV-1) | 0.21 |
| Solvent (Solv-3) | 0.08 |
| Layer 7: Protective Layer | |
| -continued | |
|---|---|
| Gelatin | 1.33 |
| Acryl-modified polyvinyl alcohol copolymer (modified 17%) (M.W.: about 60,000) | 0.17 |
| Flowing paraffin | 0.03 |
(ExY) Yellow Coupler
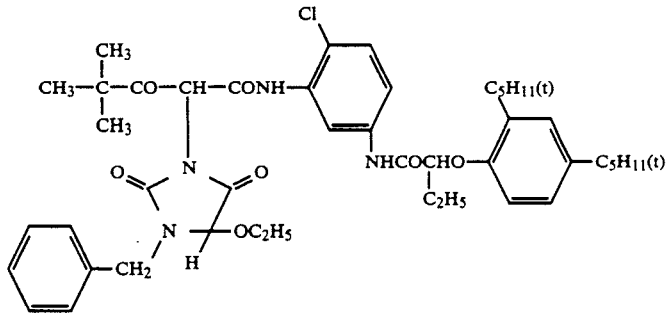
(ExM) Magenta Coupler
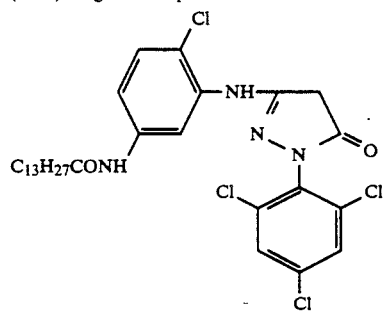
(ExC) Cyan Coupler
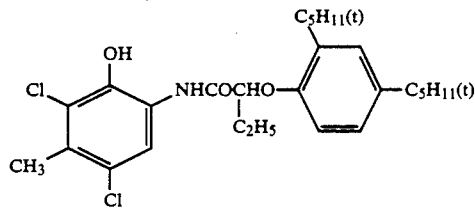
(Cpd-1) Color Image Stabilizer
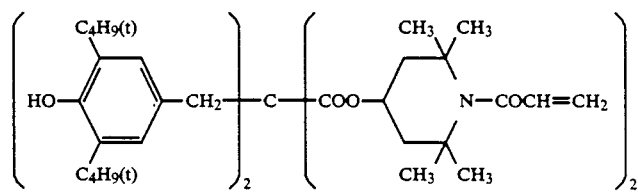
(Cpd-2) Color Mixing Inhibitor
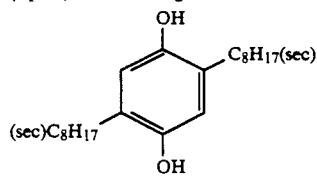
(Cpd-3) Color Image Stabilizer

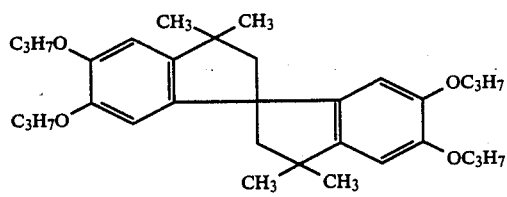
(Cpd-4) Color Image Stabilizer
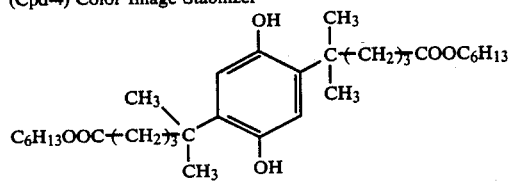
(Cpd-5)
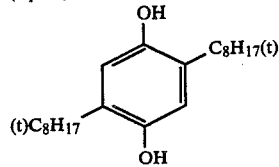
(Cpd-6)
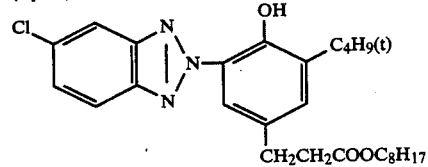
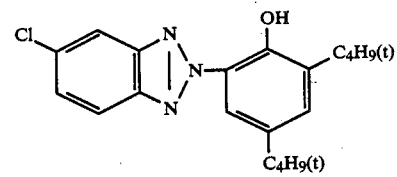
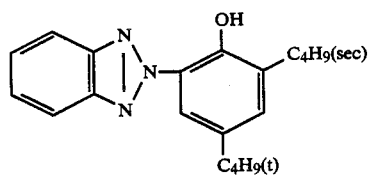
with the above three in a mixture ration of 5/8/9 (by weight)
(Cpd-7) Polymer
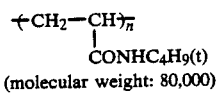
(molecular weight: 80,000)
(UV-1) Ultraviolet Light Absorbent
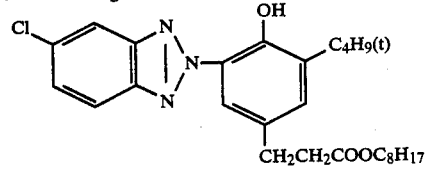
-continued
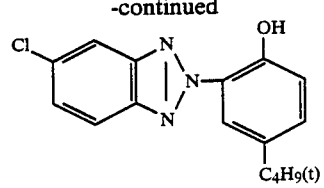
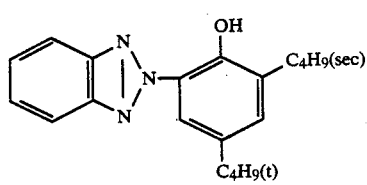
where the mixture ratio for the above is 2/9/8 (by weight)

(Solv-1) Solvent

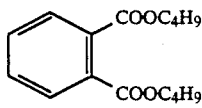

(Solv-2) Solvent

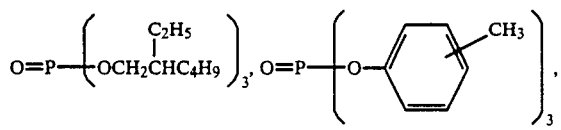

where the above are mixed in a 1/1 ratio (by volume)

(Solv-3) Solvent

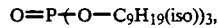

(Solv-4) Solvent

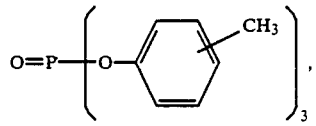

The red-sensitive layer of the resulting multilayered color printing paper (Photosensitive Materials A-1M through B-14M) was tested for the degree of variation of photographic sensitivity with the passage of time from the point of preparation of the coating, and the degree of variation in photographic sensitivity of the paper under storage.

In order to evaluate the change in photographic sensitivity with time following the preparation of the coating liquid for the red-sensitive layer, the coating was maintained at 40° C. following its preparation and applied 30 minutes later. Another sample was maintained at 40° C. for 6 hours and then applied. Optical wedges and red filters were used to make 0.5 second exposures and then these were developed using the developer solution below to bring out the color image. The amount of variation after storage was tested by storing the coated materials at 60° C. and 40% humidity for 2 days, and then, prior to exposure, the coated materials were held at 15° C. and 55% humidity and exposed and processed in the same manner as described above.

The reflection density of the processed prints was then measured and graphs of the resulting characteristics were prepared.

The change in the photographic sensitivity with time following the preparation of the coating liquid was evaluated by assigning a density of 1.0 to the samples which were held at 40° C. for 30 minutes, and then the change in density, D, was determined with respect to the samples held for 6 hours at 40° C. To evaluate the degree of variation in photographic sensitivity resulting from storage, the materials were prepared by coating 30 minutes after the preparation of the coating liquid, which had been maintained at 40° C. A value of 1.0 was assigned to the coated materials which were exposed without allowing time to elapse, and the change in image density D with respect to the stored samples was determined. Those results are shown in Tables 3 and 4.

| Process | Development Process Temperature (°C.) | Time (seconds) |
| --- | --- | --- |
| Color Developing | 35 | 45 |
| Bleaching-Fixing | 30–36 | 45 |
| Stabilizing (1) | 30–37 | 20 |
| Stabilizing (2) | 30–37 | 20 |
| Stabilizing (3) | 30–37 | 20 |
| Stabilizing (4) | 30–37 | 30 |
| Drying | 70–85 | 60 |

(The stabilizing took place in counter flow system from stabilizing (4) to (1).)

The processing solution compositions were as follows.

| Color Developing Solution: | |
| --- | --- |
| Water | 800 ml |
| Ethylenediaminetetraacetate | 2.0 g |
| Triethanolamine | 8.0 g |
| Sodium Chloride | 1.4 g |
| Potassium Carbonate | 25.0 g |
| N-Ethyl-N-(β-methanesulfonamido ether)-3-methyl-4-aminoaniline Sulfate Salt | 5.0 g |
| N,N-Diethylhydroxylamine | 4.2 g |
| 5,6-Dihydroxybenzene-1,2,4-trisulfonate | 0.3 g |
| Fluorescent Whitener (4,4'-diaminostilbene) | 2.0 g |
| Water added to make | 1,000 ml |
| pH | 10.10 |
| Bleaching-Fixing Solution: | |
| Water | 400 ml |
| Ammonium Thiosulfate (70%) | 100 ml |
| Sodium Nitrite | 18 g |
| Ammonium Ethylenediaminetetraacetato Ferrate | 55 g |
| Disodium Ethylenediaminetetraacetic Acid | 3 g |
| Glacial Acetic Acid | 8 g |
| Water added to make | 1,000 ml |
| pH | 5.5 |
| Stabilizing Solution: | |
| Formalin (37%) | 0.1 g |
| Formalin-Sulfite Additive | 0.7 g |
| 5-Chloro-2-methyl-4-isothiazolin-3-one | 0.02 g |
| 2-Methyl-4-isothiazolin-3-one | 0.01 g |
| Cupric Sulfate | 0.005 g |
| Water added to make | 1,000 ml |
| pH | 4.0 |

TABLE 3

| Materials | Red-Sensitive Emulsion | Sensitizing Dye in Red Layer Compound No. | ΔD (time until coating) | ΔD (after storage) | Comments |
| --- | --- | --- | --- | --- | --- |
| A-1M | A-1 | S-1 | −0.15 | −0.20 | Comparison |
| A-2M | A-2 | S-2 | −0.12 | −0.15 | " |
| A-3M | A-3 | S-3 | −0.10 | −0.20 | " |
| A-4M | A-4 | S-4 | −0.10 | −0.13 | " |
| A-5M | A-5 | S-5 | −0.08 | −0.15 | " |
| A-6M | A-6 | 3 | −0.02 | −0.06 | Invention |
| A-7M | A-7 | 4 | −0.01 | −0.04 | " |
| A-8M | A-8 | 5 | −0.01 | −0.04 | " |
| A-9M | A-9 | 6 | −0.01 | −0.03 | " |
| A-10M | A-10 | 7 | −0.04 | −0.04 | " |
| A-11M | A-11 | 10 | −0.02 | −0.02 | " |

TABLE 3-continued

| Materials | Red-Sensitive Emulsion | Sensitizing Dye in Red Layer Compound No. | ΔD (time until coating) | ΔD (after storage) | Comments |
|---|---|---|---|---|---|
| A-12M | A-12 | 11 | −0.03 | −0.04 | " |
| A-13M | A-13 | 13 | −0.01 | −0.03 | " |
| A-14M | A-14 | 15 | −0.02 | −0.03 | " |

TABLE 4

| Materials | Red-Sensitive Emulsion | Sensitizing Dye in Red Layer Compound No. | ΔD (time until coating) | ΔD (after storage) | Comments |
|---|---|---|---|---|---|
| B-1M | B-1 | S-1 | −0.38 | −0.15 | Comparison |
| B-2M | B-2 | S-2 | −0.30 | −0.10 | " |
| B-3M | B-3 | S-3 | −0.16 | −0.13 | " |
| B-4M | B-4 | S-4 | −0.20 | −0.08 | " |
| B-5M | B-5 | S-5 | −0.21 | −0.08 | " |
| B-6M | B-6 | 3 | −0.05 | −0.02 | Invention |
| B-7M | B-7 | 4 | −0.04 | −0.02 | " |
| B-8M | B-8 | 5 | −0.03 | −0.03 | " |
| B-9M | B-9 | 6 | −0.02 | −0.01 | " |
| B-10M | B-10 | 7 | −0.05 | −0.02 | " |
| B-11M | B-11 | 10 | −0.02 | −0.02 | " |
| B-12M | B-12 | 11 | −0.04 | −0.01 | " |
| B-13M | B-13 | 13 | −0.02 | −0.01 | " |
| B-14M | B-14 | 15 | −0.02 | −0.01 | " |

As is clear from the above results, the silver halide emulsion containing the red-sensitizing dye of this invention produced dramatically less variation in photosensitivity resulting from storage of the coating solution and of the coated materials in a multilayered color printing paper.

EXAMPLE 2

Except for changing layer 3 of the multilayered color photosensitive material as described below, all other conditions were as in Example 1.

| Layer 3: Green-Sensitive Layer | |
|---|---|
| Silver halide emulsion | 0.16 |
| Gelatin | 1.80 |
| Magenta coupler (ExM/) | 0.35 |
| Color image fixer (Cpd-3) | 0.20 |
| Solvent (Solv-5) | 0.65 |

The resulting materials were tested as in Example 1 and similar results were obtained.

EXAMPLE 3

Except for using 1,2-bis(vinyl sulfonyl) ethane as the gelatin hardener for the various layers, other conditions were as in Example 1 in preparing the coated materials.

The resulting materials were tested as in Example 1 and similar results were obtained.

EXAMPLE 4

With regard to the multilayered photosensitive materials of Example 1, the developing process and the developer solution was changed as follows for A-1M, A-2M, A-3M, A-4M, A-5M, A-6M, A-7M, A-8M, A-9M, A-10M, A-11M, A-12M, A-13M and A-14M materials, but other conditions were as in Example 1 in the preparation of the coated materials.

(ExM/) Magenta Coupler:

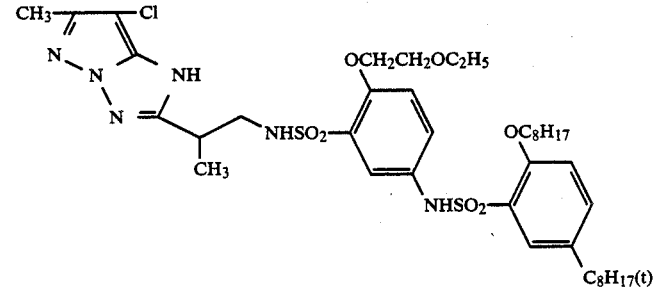

(Solv-5) Solvent:
(a 2/1 mixture (by weight) of)

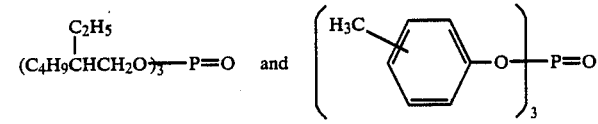

| Process | Temperature (°C.) | Time |
|---|---|---|
| Color Developing | 38 | 3 min 30 sec |
| Bleach-Fixing | 30–35 | 1 min 30 sec |
| Stabilizing (1) | 30–35 | 1 min 00 sec |
| Stabilizing (2) | 30–35 | 1 min 00 sec |
| Stabilizing (3) | 30–35 | 1 min 00 sec |
| Drying | 70–80 | 1 min 30 sec |

(The stabilizing took place in counter flow system from stabilizing (3) to (1).)

| Color Developing Solution: | |
|---|---|
| Water | 800 ml |
| Hydroxyethoxyiminodiacetate | 4.0 g |
| 1-Hydroxyethylidene-1,1-diphosphate (60%) | 1.0 g |
| Magnesium Chloride | 0.8 g |
| Benzyl Alcohol | 15 ml |
| Diethylene Glycol | 15 ml |
| Potassium Sulfite | 2.0 g |
| Potassium Bromide | 1.1 g |
| Potassium Carbonate | 30 g |
| N-Ethyl-N-(β-methanesulfonamidoethyl)-3-methyl-4-aminoaniline Sulfate Salt | 5.5 g |
| Hydroxylamine Sulfate Salt | 3.0 g |
| Fluorescent Whitener (4,4'-diaminostilbene) | 2.0 g |
| Water added to make | 1,000 ml |
| pH (25° C.) | 10.2 |
| Bleach-Fixing Solution: | |
| Water | 400 ml |
| Ammonium Thiosulfate (70%) | 100 ml |
| Ammonium Sulfite (40%) | 27.5 ml |
| Ammonium Ethylenediaminetetraacetic Acid Iron(III) | 60 g |
| Disodium Ethylenediaminetetraacetate | 3 g |
| Water added to make | 1,000 ml |
| pH (25° C.) | 7.10 |
| Stabilizer: | |
| 1-Hydroxyethylidene-1,1-diphosphonic Acid (60%) | 1.6 ml |
| Bismuth Chloride | 0.3 g |
| Polyvinyl Pyrrolidone | 0.3 g |
| Ammonium Water (26%) | 2.5 ml |
| Nitrilotriacetate | 1.0 g |
| 5-Chloro-2-methyl-4-isothiazolin-3-one | 0.05 g |
| 2-Octyl-4-isothiazolin-3-one | 0.05 g |
| Fluorescent Whitener (4,4'-diaminostilbene) | 1.0 g |
| Water added to make | 1,000 ml |
| pH (25° C.) | 7.5 |

These materials were tested as in Example 1 and similar effects were confirmed.

This invention allows for the production of silver halide emulsions which have substantially no variation in photographic sensitivity between lots and excellent long term storage properties. These effects are particularly pronounced when used with high silver chloride emulsions.

While the invention has been described in detail and with reference to specific embodiments thereof, it will be apparent to one skilled in the art that various changes and modifications can be made therein without departing from the spirit and scope thereof.

What is claimed is:

1. A silver halide photosensitive material comprising at least one layer of a silver halide emulsion layer provided on a base, wherein said at least one silver halide emulsion layer comprises at least one dye compound represented by general formula (I):

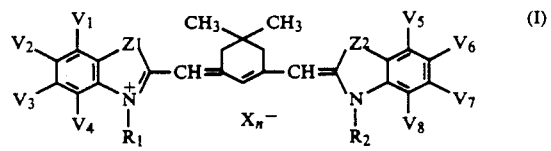

wherein $Z_1$ and $Z_2$ each independently represents a sulfur atom or a selenium atom;

$R_1$ and $R_2$ each independently represents an alkyl group, provided that at least one of $R_1$ or $R_2$ must represent an unsubstituted alkyl group selected from the group consisting of a butyl group, a pentyl group, a hexyl group, a heptyl group and an octyl group;

$V_1, V_2, V_3, V_4, V_5, V_6, V_7$ and $V_8$ each independently represents a hydrogen atom, a halogen atom, an alkyl group, an acyl group, an acyloxy group, an alkoxycarbonyl group, a carbamoyl group, a sulfamoyl group, a carboxy group, a cyano group, a hydroxy group, an amino group, an acylamino group, an alkoxy group, an alkylthio group, an alkylsulfonyl group, a sulfonate group, or an aryl group, provided that adjacent groups represented by $V_1$ to $V_8$ can bond to each other via their carbon atoms to form a condensed ring;

X represents a charged ion in equilibrium, and n is a value necessary to neutralize the electrical charge of said dye compound.

2. A silver halide photosensitive material according to claim 1, wherein said silver halide emulsion layer contains silver chloride or silver chlorobromide having 90 mol % or more of silver chloride content based on the total mols of silver halide in said layer.

3. A silver halide photosensitive material according to claim 1, wherein $R_1$ ($R_2$) represents $C_1$ to $C_{18}$ non-substituted alkyl group, and $R_2$ ($R_1$) represents $C_4$ to $C_{18}$ non-substituted alkyl group.

4. A silver halide photosensitive material according to claim 1, wherein X represents an iodide ion and n is 1.

5. A silver halide photosensitive material according to claim 1, wherein said compound represented by general formula (I) is contained in said at least one silver halide emulsion layer in an amount of from $1 \times 10^{-6}$ to $1 \times 10^{-3}$ mol per mol of silver halide contained in said emulsion.

6. A silver halide photosensitive material according to claim 1, wherein said silver halide comprises silver chloride, silver chlorobromide or silver chlorobromoiodide.

7. A silver halide photosensitive material according to claim 2, wherein said silver halide emulsion forms a silver bromide localized phase containing at least 20 mol % of silver bromide 8. A silver halide photosensitive material according to claim 7, wherein said silver halide emulsion contains iridium and a silver bromide localized phase which is formed by precipitating silver halide grains together with at least 50 mol % of all iridium added.

9. A silver halide photosensitive material according to claim 8, wherein said silver halide emulsion contains iridium and a silver bromide localized phase which is formed by precipitating silver halide grains together with at least 80 mol % of all iridium added.

10. A silver halide photosensitive material according to claim 9, wherein said silver halide emulsion contains iridium and a silver bromide localized phase which is formed by precipitating silver halide grains together with all iridium added.

11. A silver halide photosensitive material according to claim 7, wherein said silver halide emulsion contains a silver bromide localized phase which is formed by adding a fine silver bromide grains or fine silver chlorobromide grains.

12. A silver halide photosensitive material according to claim 8, wherein said silver halide emulsion contains a silver bromide localized phase which is formed by adding fine silver bromide grains on fine silver chlorobromide grains previously doped with iridium.

13. A silver halide photosensitive material according to claim 1, wherein said silver halide emulsion contains a supersensitizing amount of a compound represented by formula (II):

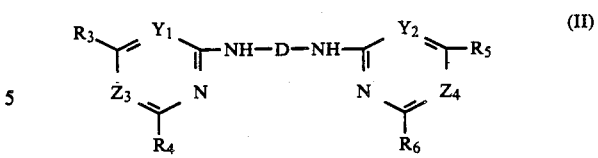

wherein D represents a residual aromatic group having a valence of 2; $R_3$, $R_4$, $R_5$ and $R_6$ each independently represents hydrogen atom, hydroxyl group, alkoxy group, aryloxy group, halogen atom, heterocyclic group, mercapto group, alkylthio group, arylthio group, heterocyclic thio group, amino group, alkylamino group, cyclohexylamino group, aralkylamino group or aryl group; $Y_1$ and $Z_3$ each independently represents —N= or —CH=, provided that at least one of $Y_1$ and $Z_3$ must represent —N=; and $Y_2$ and $Z_4$ are the same as $Y_1$ and $Z_3$ respectively.

* * * * *